United States Patent
Yamakawa et al.

(10) Patent No.: US 6,784,127 B1
(45) Date of Patent: Aug. 31, 2004

(54) POLYURETHANE ELASTIC FIBER NONWOVEN FABRIC AND ITS PRODUCTION AND SYNTHETIC LEATHER USING THE SAME

(75) Inventors: Yukio Yamakawa, Hofu (JP); Tadashi Furuya, Hofu (JP); Eiji Kawabata, Hofu (JP); Yutaka Tanaka, Osaka (JP)

(73) Assignees: Kanebo, Limited, Tokyo (JP); Kanebo Gohsen, Limited, Osaka (JP)

( * ) Notice: Subject to any disclaimer, the term of this patent is extended or adjusted under 35 U.S.C. 154(b) by 0 days.

(21) Appl. No.: 09/890,742

(22) PCT Filed: Feb. 21, 2000

(86) PCT No.: PCT/JP00/00983

§ 371 (c)(1),
(2), (4) Date: Sep. 24, 2001

(87) PCT Pub. No.: WO00/50680

PCT Pub. Date: Aug. 31, 2000

(30) Foreign Application Priority Data

Feb. 24, 1999 (JP) .......................................... 11-046083

(51) Int. Cl.[7] .......................... B32B 27/12; D04H 1/54; D04H 3/16; D02G 3/02
(52) U.S. Cl. ........................ 442/409; 442/104; 442/105; 442/409; 442/414; 428/365; 428/904
(58) Field of Search ................................. 442/104, 105, 442/400, 401, 409, 414; 428/365, 904

(56) References Cited

U.S. PATENT DOCUMENTS 5,308,697 A * 5/1994 Muramoto et al. ......... 428/373
6,248,445 B1 * 6/2001 Yamakawa et al. ......... 428/373

FOREIGN PATENT DOCUMENTS

JP    06-293117 A   *   10/1994
JP    09-188951 A   *   7/1997

* cited by examiner

*Primary Examiner*—Cheryl A. Juska
*Assistant Examiner*—Jenna-Leigh Befumo
(74) *Attorney, Agent, or Firm*—Flynn, Thiel, Boutell & Tanis, P.C.

(57) ABSTRACT

A polyurethane elastomer fiber non-woven fabric contains polyurethane elastomer fiber filaments melt-bonded with one another, and has a tensile elongation of 100% or more, a 50% elongation recovery of 75% or more and a tear strength per METSUKE of 5.5 gf or more. The non-woven fabric can be prepared by a method of providing a thermoplastic polyurethane elastomer having Shore hardness A of 92 or more, drying the elastomer to a water content of 150 ppm or less, and melt-spinning and, at the same time, spraying it together with a high speed gas stream so as to deposit and laminate the elastomer into a sheet form. A synthetic leather using the non-woven fabric is also provided. The non-woven fabric has not only an excellent elasticity but also high tear strength.

2 Claims, No Drawings

POLYURETHANE ELASTIC FIBER NONWOVEN FABRIC AND ITS PRODUCTION AND SYNTHETIC LEATHER USING THE SAME

TECHNICAL FIELD

The present invention relates to a polyurethane elastic fiber nonwoven fabric wherein polyurethane elastic fiber filaments are mutually fused and bonded and the production thereof, and a synthetic leather using the polyurethane elastic fiber nonwoven fabric and, more particularly, to a polyurethane elastic fiber nonwoven fabric having excellent stretchability and high tear strength and the production thereof, and a synthetic leather using the polyurethane elastic fiber nonwoven fabric.

BACKGROUND ART

Among polyurethane elastic fiber nonwoven fabrics made of polyurethane elastic fiber filaments, a polyurethane elastic fiber nonwoven fabric produced by a so-called "melt-blow spinning method" has hitherto been used in the fields where comparatively good conformability to the movement of human body is required (for example, the side band of a paper diaper, a base fabric of an emergency adhesive plaster, a disposable glove, etc.) or the fields where comparatively short stretchability is required (outerwear fields, for example, sports clothes, stretchable cotton pads, etc.) because of excellent stretchability, flexibility and permeability.

Japanese Unexamined Patent Publication No. 6-293117 discloses that a synthetic leather having excellent stretchability is obtained by using this kind of a polyurethane elastic fiber nonwoven fabric as a base material for synthetic leather, and also suggests the use of such a synthetic leather as materials of shoes, bags, pouches, furniture, interiors, car sheets, and clothes.

However, since such a polyurethane elastic fiber nonwoven fabric has excellent stretchability and flexibility, as described above, but generally has a low tear strength, a sufficient tear strength as one of the important basic physical properties of the synthetic leather cannot be attained when used as a base material of the synthetic leather. Depending on the purposes of the synthetic leather, products suitable for practical use cannot be obtained.

Thus, an object of the present invention is to provide a polyurethane elastic fiber nonwoven fabric having both excellent stretchability and high tear strength and the production thereof, and a synthetic leather using the polyurethane elastic fiber nonwoven fabric.

DISCLOSURE OF THE INVENTION

To solve the problems described above, the present invention provides a polyurethane elastic fiber nonwoven fabric comprising polyurethane elastic fiber filaments which are mutually fused and bonded, wherein a tensile elongation is not less than 100%, a recovery at 50% elongation is not less than 75%, and a tear strength per basis weight is not less than 5.5 gf, which is produced by dehydrating a thermoplastic polyurethane elastomer having a Shore A hardness of not less than 92, thereby reducing the moisture content to 150 ppm or less, melt-spinning the thermoplastic polyurethane elastomer, scattering the resulting polyurethane filaments through a high-speed air flow, and depositing and laminating the filaments in a sheet form at a temperature which is 35° C. lower than the Vicat softening temperature.

As described above, the polyurethane elastic fiber nonwoven fabric of the present invention is basically produced by a melt-blow spinning method. A general procedure of the melt-blow spinning method will now be described simply below. That is, the melt-blow spinning method is characterized by feeding a molten thermoplastic polymer to nozzle holes arranged in a line, continuously extruding the molten polymer through the nozzle holes, blowing off a high-temperature gas from slits arranged at both sides of the group of nozzles at high speed, thinning and solidifying the polymer extruded through the nozzle holes by means of gas energy to form continuous filaments, depositing and laminating the group of the continuous filaments on a moving conveyor net, and mutually bonding the filaments due to self-bonding properties of the filaments themselves.

The first feature of the present invention is that the strength of the filaments obtained by melt spinning is enhanced by using a hard thermoplastic polyurethane having a Shore A hardness of not less than 92 as a thermoplastic polymer. The Shore A hardness means a standard of the hardness of a comparatively soft substance and is represented by a value within a range from 0 to 100. On the other hand, the hardness of a comparatively hard urethane is represented by a Shore D hardness. A thermoplastic polyurethane, which can be produced industrially at present, is a product having a hardness within a range from a Shore A hardness of about 70 to a Shore D hardness of about 75. Accordingly, the "thermoplastic polyurethane having a Shore A hardness of not less than 92" in the present invention means a thermoplastic polyurethane, the upper hardness limit of which is up to a Shore D hardness of about 75.

A general thermoplastic urethane is produced by reacting a comparatively high-molecular polyol component which forms a soft segment moiety, and a low-molecular diol and a diisocyanate compound which form a hard segment moiety. The thermoplastic polyurethane having a Shore A hardness of not less than 92 used in the present invention is a polyurethane containing the hard segment moiety in a comparatively large amount and those wherein the nitrogen content, which is a standard of the hardness, in the polymer is about not less than 4% by weight corresponding to the thermoplastic polyurethane.

Although the soft segment component of the polyurethane includes, for example, polyetherdiol, polyesterdiol and polycarbonatediol components, any component may be used in the present invention. Although the diisocyanate compound includes, for example, aromatic compounds, typically, 4,4'-diphenylmethane diisocyanate (MDI) and aliphatic diisocyanates, typically, hexamethylene diisocyanate, any compound can be used in the present invention.

If necessary, additives for the polymer, for example, hindered phenol antioxidants and various amine antioxidants; benzotriazole ultraviolet absorber and hindered amine ultraviolet absorber; smoothing agents such as amide wax and montanoic acid wax; thermal decomposition inhibitors such as various carbodiimide compounds; various pigments such as titanium oxide and red iron oxide; and gas yellowing inhibitors may be added.

Although the method of polymerizing a polymer includes, for example, various methods such as the continuous melt polymerization method, vat curing method, belt method and kneader method, any polymerization method may be used in the present invention.

Although the hardness of the thermoplastic polyurethane basically depends on the mixing ratio of the respective components described above, the hardness varies with the ratio of the hard segment moiety to the soft segment moiety, the length of the hard segment moiety, and the state of phase separation. The thermoplastic polyurethane used in the present invention is preferably a polyurethane wherein the hard segment moiety is long and is contained in a large amount and also the Vicat softening temperature is high. Specifically, as described above, a thermoplastic polyurethane having a Shore A hardness of not less than 92 and Vicat softening temperature of not lower than 120° C. is preferably used.

The second feature of the present invention is that the thermoplastic polyurethane is dehydrated to reduce the moisture content to 150 ppm or less, preferably 110 ppm or less, more preferably 70 ppm or less, and molten before melt-blow spinning. The reason is as follows.

The "hard thermoplastic polyurethane having the Shore A hardness of not less than 92" used in the present invention has such characteristics that the melting point is higher than that of the thermoplastic polyurethane used in a conventional melt-blow nonwoven fabric and the melt density is drastically high. For example, the melt viscosity measured at 190° C. of the thermoplastic polyurethane having the Shore A hardness of 85 is within a range from about 5,000 to 50,000 poise, whereas, the melt viscosity of the thermoplastic polyurethane used in the present invention is within a range from 100,000 to 1,000,000.

By the way, since the molten polymer is drawn to a proper fiber diameter by heating air in the melt-blow spinning process, the melt viscosity on extrusion through a nozzle must be drastically reduced regardless of the composition of the polyurethane. Accordingly, although the thermoplastic polyurethane having a high viscosity used in the present invention must be spun at very high temperature during melt-blow spinning, the thermoplastic polyurethane is thermally decomposed, vigorously, when it is molten at high temperature. It is well known that a urethane bond is thermally decomposed, vigorously, when the temperature exceeds 230° C. When the melt-blow spinning of the thermoplastic polyurethane is carried out under conditions of vigorous thermal decomposition, the molten polymer extruded through the nozzle foams, thus making it impossible to form a filament, in the worst case.

Under the conditions of comparatively less thermal decomposition, a nonwoven fabric can be obtained without causing yarn breakage, but the resulting nonwoven fabric has poor mechanical properties because of reduction of the tensile strength. The cause for deterioration of mechanical properties is deemed as follows. That is, the thermoplastic polyurethane chemically changes during melting, thereby to reduce the molecular weight or to cause insufficient crystallization and rearrangement of the hard segment moiety after formation of the filament.

Thus, according to the present invention, the above-described adverse influence exerted as a result of the use of the high-hardness polymer can be reduced to the minimum by reducing the moisture content of the thermoplastic polyurethane to 150 ppm or less, preferably 110 ppm or less, more preferably 70 ppm or less, before melt-blow spinning.

The third feature of the present invention is that filaments are deposited and laminated in a sheet form at a temperature which is 35° C. lower than the Vicat softening temperature. The reason is as follows.

The polyurethane elastic fiber nonwoven fabric, which is obtained by melt-blow spinning of the thermoplastic polyurethane used in the present invention, presented such a phenomenon that mutual bonding of the filaments exerts an influence not only on the tensile strength, but also on the tear strength. Enhancement of a mutual bonding force between the filaments usually increases the tensile strength, while decreasing the tear strength, though a polyurethane elastic fiber nonwoven fabric does not always behave in the manner described above. Therefore, it becomes necessary to optimize the mutual bonding force between the filaments to obtain a nonwoven fabric having a good balance between the tensile strength and the tear strength.

The most effective method of controlling the mutual bonding force between the filaments is to control the depositing point temperature of the filaments in case the molten polymer extruded through the nozzle is deposited and laminated on the conveyor net while thinning and cooling by a high-temperature gas flow. This depositing point temperature varies with the melting temperature, the temperature of the high-temperature gas, or the flow rate, and the condition capable of exerting a largest influence on the depositing temperature is a distance between the nozzle and the conveyor net. If other conditions are the same, the depositing point temperature of the filaments decreases when the distance between the nozzle and the conveyor net increases. Suction of the heating air under the conveyor net is also an important condition to control the depositing point temperature of the filaments. The larger the suction amount of the heating air under the conveyor net, the more the depositing point temperature of the filaments decreases. The suction amount is preferably set to an amount which is two times, more preferably three times, larger than the flow rate of the heating air.

The depositing point temperature can be set by using the Vicat softening temperature of the urethane polymer as the standard. When the filaments are deposited in the state where the temperature is higher than the Vicat softening temperature, a film-like nonwoven fabric is obtained because of insufficient solidification of the filaments. When the filaments are cooled to a temperature lower than the Vicat softening temperature, the mutual bonding force between the filaments is reduced virtually in proportion to the difference between the temperature and the Vicat softening temperature.

Accordingly, according to the present invention, high tear strength of not less than 5.5 gf is attained in place of reducing the tensile strength to some degree by depositing and laminating the filaments after cooling to the temperature so that a difference in temperature becomes higher than 35° C. It becomes possible to further enhance the tear strength by subjecting to various treatments such as lamination, softening, heat treatment, embossing and the like.

As described above, the nonwoven fabric having a high tear strength of the present invention can be obtained by the method of subjecting a high-hardness polyurethane to melt-blow spinning in the state where a chemical change is reduced to the minimum, thereby to comparatively reduce the bonding force of filaments on deposition and to maintain a large degree of freedom of the filaments, which constitute the nonwoven fabric. The reason why the tear strength is enhanced by maintaining a large degree of freedom of the filaments is deemed as follows. That is, since a lot of filaments participate in the portion to be broken, one-point concentration of stress does not occur.

The fiber diameter of the filaments, which constitute the polyurethane elastic nonwoven fabric of the present invention, is preferably within a range from about 5 to 50 μm. The smaller the fiber diameter, the more flexible the resulting nonwoven fabric becomes. When the fiber diameter is smaller than 5 μm, the tear strength is reduced.

The polyurethane elastic nonwoven fabric of the present invention can realize a synthetic leather having both excellent stretchability and high tear strength, wherein a tensile elongation is not less than 100%, a recovery at 50% elongation is not less than 75%, and a tear strength per basis weight is not less than 2.5 gf, preferably not less than 3.0 gf, by laminating a skin layer made of a urethane elastomer onto the surface of the polyurethane elastic nonwoven fabric as a base material. The basis weight of the nonwoven fabric is usually within a range from about 25 to 500 g/m$^2$, but is preferably from about 50 to 400 g/m$^2$ when used as the base material of the synthetic leather.

A conventional synthetic leather has a structure wherein a skin layer made of a polyurethane is laminated onto a woven knitted fabric or nonwoven fabric made of non-stretchable fibers, and such a synthetic leather is mainly produced by two kinds of methods. The first method is a wet method of regenerating a urethane layer in water from a urethane solution coated on a fiber layer as a base material, while the second method is a dry method, typically a method of coating a skin layer produced in a separate step with an adhesive and laminating the coated skin layer onto a fiber layer as a base material. Among these two kinds of methods, the dry method is suited for the method of producing the synthetic leather of the present invention. The synthetic leather produced by the dry method generally has such a structure that a polyurethane surface layer having a thickness within a range from about 10 to 70 μm is firmly bonded onto a fiber base material having a thickness within a range from about 0.3 to 1.5 mm via an adhesive layer having a thickness within a range from about 20 to 150 μm.

The skin layer used in the synthetic leather of the present invention can be produced by the method of coating a crested release paper with a urethane resin solution for skin and drying the urethane resin solution in a dry oven or the method of drying and solidifying a slurry solution or dispersion of a polyurethane resin for skin to form a sponge-like skin.

To bond the polyurethane elastic fiber nonwoven fabric as the base material with the skin layer, adhesive solutions composed mainly of a polyurethane resin having reactivity, a crosslinking agent, and a reaction accelerator, which are generally used, can be used. Among these adhesive solutions, an adhesive solution using only a polar solvent capable of remarkably dissolving a urethane such as N,N-dimethylformamide (DMF), N,N-dimethylacetamide (DMAc) or the like is not preferred because it easily dissolves the urethane elastic fiber nonwoven fabric of the present invention.

In the present invention, an aqueous adhesive which does not dissolve a urethane, an adhesive solution using a solvent (e.g. methyl ethyl ketone (MEK), toluene, etc.) which does not dissolve a urethane but swells the urethane, or an adhesive solution using a mixed solvent of these solvents and DMF or DMAc is preferred. A urethane hot-melt adhesive capable of bonding without using any solvent is particularly preferred in the present invention. Although the hot-melt adhesive is roughly classified into a spray type adhesive which is coated to the adhesive portion in a molten state and is capable of bonding until the adhesive is solidified, and the other type adhesive which is molten and bonded with heating after interposing a solid adhesive in a state of a nonwoven fabric, any type may be employed.

With respect to the synthetic leather of the present invention, the skin layer may be bonded after physical properties of the nonwoven fabric were improved by subjecting the polyurethane elastic fiber nonwoven fabric before laminating the skin layer onto a treatment such as heat press, needle punching, rubbing or impregnation with an elastic polymer solution.

The synthetic leather of the present invention can be produced, for example, by the following manner. First, a crested release paper is coated with a urethane resin solution for skin in a coating weight of about 50 to 200 g/m$^2$ using a coater and the urethane resin solution is dried in a hot oven. Then, the skin layer is coated with a urethane adhesive solution in a coating weight of about 100 to 300 g/m$^2$ and, after sufficiently drying the solvent, a polyurethane elastic fiber nonwoven fabric fed by a pressure roller is laminated and nipped, thereby properly impregnating the polyurethane elastic fiber nonwoven fabric with the adhesive. The reactive adhesive is reacted by aging in the state, and then the release paper is removed and the resulting synthetic leather is taken up. In case the degree of the reaction of the adhesive is insufficient, the reaction is completed by aging at 60 to 100° C. It is preferred to select a material having good stretchability and excellent permeability as the skin layer and adhesive used in the present invention.

The synthetic leather of the present invention has a three-layer structure composed of a urethane stretchable nonwoven fabric, an adhesive layer and a skin layer, and physical properties of a fiber layer as the base material greatly contribute to physical properties such as tensile elongation, elongation recovery and tear strength of the synthetic leather having such a structure. As a similar structure synthetic leather having stretchability, for example, a synthetic leather obtained by laminating a skin layer onto a nylon tricot having stretchability or a stretchable woven fabric as the base material is known. These synthetic leathers have large tensile strength and high tear strength, as a feature of a nylon filament product, but have drawbacks that the tensile elongation is small and the elongation recovery is drastically lowered. On the other hand, the synthetic leather of the present invention has excellent stretchability and large tear strength of not less than 2.5 gf per basis weight.

The synthetic leather requires the tear strength of not less than 2.5 gf per basis weight and the reason lies in durability when applying the synthetic leather to uses, for example, shoes, sheets and furniture. For example, when pinholes are formed, breakage easily occurs from pinholes in case of a synthetic leather having a low tear strength, while the synethetic leather having a tear strength of not less than 2.5 gf, preferably not less than 3.0 gf, per basis weight does not present such a phenomenon that breakage results from pinholes.

The synthetic leather of the present invention has such a surprising performance wherein clear embossing, that could have never been performed in the case of a conventional synthetic leather, can be carried out and a clear emboss thus formed does not disappear, even if severe elongation recovery is repeated and, furthermore, a portion having a very small curvature can also be embossed and the embossed form is not impaired by a strong outer force. Such a surprising performance is deemed as a reflection of a proper conformability capable of conforming to any form of the polyurethane elastic fiber nonwoven fabric of the present invention and excellent thermosetting properties of the hard segment moiety of a comparatively hard polyurethane.

INDUSTRIAL APPLICABILITY

The synthetic leather of the present invention is fit for use as, for example, sports shoes used in tennis, golf, and track and field events by utilizing excellent stretchability and flexibility described above, and can also be fit for uses as, for example, furniture and sheet materials by making use of embossability and integral moldability. It can be said that the synthetic leather is also fit for uses as, for example, clothes such as outerwear by making use of excellent draping quality, in addition to the flexibility and stretchability.

What is claimed is:

1. A non-woven polyurethane fabric comprising polyurethane elastic fiber filaments which are mutually fused and bonded and having a tensile elongation of not less than 100%, a recovery at 50% elongation of not less than 75% and a tear strength per basis weight of not less than 5.5 gf, said fabric being produced by dehydrating a thermoplastic polyurethane elastomer having a Shore A hardness of not less than 92 to reduce the moisture content thereof to no more than 150 ppm, melt-spinning the thermoplastic polyurethane elastomer and depositing and laminating the filaments in a sheet form at a temperature which is 35° C. lower than the Vicat softening temperature.

2. A synthetic leather comprising a base material layer made of a non-woven polyurethane fabric comprising polyurethane elastic fiber filaments which are mutually fused and bonded and having a tensile elongation of not less than 100%, a recovery at 50% elongation of not less than 75% and a tear strength per basis weight of not less than 5.5 gf, said fabric being produced by dehydrating a thermoplastic polyurethane elastomer having a Shore A hardness of not less than 92 to reduce the moisture content thereof to no more than 150 ppm, melt-spinning the thermoplastic polyurethane elastomer and depositing and laminating the filaments in a sheet form at a temperature which is 35° C. lower than the Vicat softening temperature.

* * * * *